(12) United States Patent
Brown et al.

(10) Patent No.: US 12,187,139 B2
(45) Date of Patent: Jan. 7, 2025

(54) TROLLEY SYSTEM

(71) Applicant: Liebherr Mining Equipment Newport News Co., Newport News, VA (US)

(72) Inventors: Joshua Brown, Newport News, VA (US); Lucas Smith, Newport News, VA (US)

(73) Assignee: LIEBHERR MINING EQUIPMENT NEWPORT NEWS CO., Newport News, VA (US)

( * ) Notice: Subject to any disclaimer, the term of this patent is extended or adjusted under 35 U.S.C. 154(b) by 832 days.

(21) Appl. No.: 17/348,683

(22) Filed: Jun. 15, 2021

(65) Prior Publication Data

US 2022/0396152 A1    Dec. 15, 2022

(51) Int. Cl.
*B60L 5/36* (2006.01)
*B60L 5/10* (2006.01)

(52) U.S. Cl.
CPC .......... *B60L 5/36* (2013.01); *B60L 5/10* (2013.01); *B60L 2200/26* (2013.01); *B60L 2200/36* (2013.01)

(58) Field of Classification Search
CPC .......... B60L 5/10; B60L 5/36; B60L 2200/26; B60L 2200/36
See application file for complete search history.

(56) References Cited

U.S. PATENT DOCUMENTS

| 5,810,136 A | 9/1998 | Siciliano et al. |
| 5,960,717 A * | 10/1999 | Andre ............ B60L 5/40 191/25 |

FOREIGN PATENT DOCUMENTS

| JP | S5574201 U | 5/1980 |
| JP | S55124336 U | 9/1980 |
| WO | 2020186296 A1 | 9/2020 |

OTHER PUBLICATIONS

ISA European Patent Office, International Search Report and Written Opinion Issued in Application No. PCT/EP2022/062410, Sep. 20, 2022, WIPO, 15 pages.

* cited by examiner

*Primary Examiner* — Robert J McCarry, Jr.
(74) *Attorney, Agent, or Firm* — McCoy Russell LLP

(57) ABSTRACT

The present application shows a trolley system for providing electrical power to a vehicle, the trolley system comprising:
  a trolley line that is at least one out of:
    a flexible structure to be loosely positioned on a ground surface; and
    a sealed structure with an insulating housing comprising a sealing arrangement for sealing an opening extending along the trolley line, and
  a current collector assembly mounted on the vehicle for establishing a sliding electrical contact with a conductor of the trolley line.

22 Claims, 9 Drawing Sheets

TROLLEY SYSTEM

TECHNICAL FIELD

The present application relates to trolley systems for providing electrical power to a vehicle, especially on a mine site or a construction site.

BACKGROUND AND SUMMARY

Usually, trolley systems comprise overhead catenary lines rigged between posts positioned along the road, with a pantograph of the vehicle or trolley arms of the vehicle contacting the catenary lines to establish a sliding electrical contact. Such systems require a large amount of infrastructure and are static, requiring constant maintenance of the road and vehicles exactly following the path defined by the catenary lines.

WO 2020/186296 A1 describes a trolley system for a truck in a mine where a trolley line is arranged on a road surface for the truck to drive above the trolley line arranged between the wheels of the truck, or at a side of the road next to the truck.

The object of the present invention is to provide an improved trolley system.

The present application comprises a trolley system for providing electrical power to a vehicle, the system comprising a trolley line and a current collector assembly mounted on the vehicle for establishing a sliding electrical contact with a conductor of the trolley line.

The present application further comprises a trolley line for providing electrical power to a vehicle, the trolley line comprising an insulating housing enclosing a conductor.

In a first aspect, the trolley line is a flexible structure to be loosely positioned on a ground surface.

In a second aspect, the trolley line is a sealed structure with the insulating housing comprising a sealing arrangement for sealing an opening extending along the trolley line, the opening allowing access for a current collector to establish a sliding electrical contact with the conductor.

The present application further comprises a method of providing electrical power to a vehicle.

In a first aspect, the method comprises:
  engaging with a current collector assembly of the vehicle a trolley line that is loosely positioned on a ground surface;
  travelling the vehicle along the trolley line, with the current collector assembly raising a section of the trolley line from the ground, and
  the current collector assembly establishing a sliding electrical contact with a conductor of the trolley line in the section of the trolley line raised from the ground.

In an embodiment, the sliding electrical contact may be established with a current collector element reaching through an opened section of an insulating housing of the trolley line.

In a second aspect, the method comprises:
  engaging with a current collector assembly of the vehicle a trolley line that is a sealed structure with an insulating housing comprising a sealing arrangement for sealing an opening extending along the trolley line;
  travelling the vehicle along the trolley line, the current collector assembly opening a section of the opening extending along the trolley line and
  the current collector assembly establishing a sliding electrical contact with a conductor of the trolley line arranged inside the insulating housing, with a current collector element reaching through the opened section of the opening of the insulating housing.

BRIEF DESCRIPTION OF THE FIGURES

The present invention will now be described with respect to embodiments and drawings.

In the drawings.

DETAILED DESCRIPTION

Figure 1:
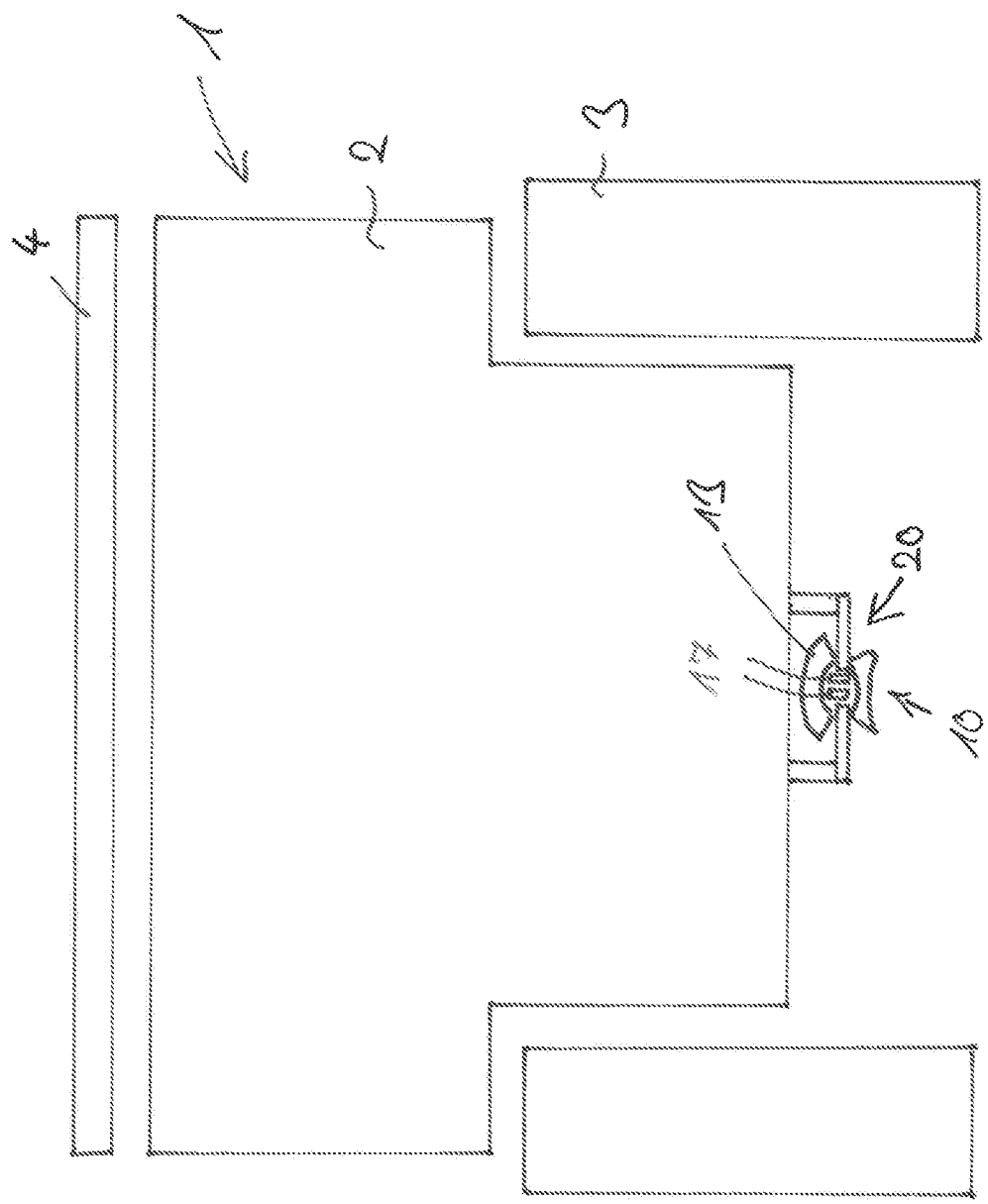
FIG. 1 shows an embodiment of a trolley system.

FIG. 1 is a schematic drawing of a trolley system for providing electrical power to a vehicle 1. In particular, the trolley system comprises a trolley line 10 and a current collector assembly 20 mounted on the vehicle 1 for establishing a sliding electrical contact with a conductor 17 of the trolley line.

The trolley system of the present invention can be used with any type of vehicle. In an embodiment of the present invention, the vehicle comprises an electrical propulsion system, with a motor of the electrical propulsion system being supplied with electrical power via the trolley system.

In an embodiment, the vehicle 1 comprises wheels 3 driven by at least one electrical motor. In an embodiment, the vehicle comprises at least two wheels, wherein preferably each wheel is driven by an electrical motor. The vehicle may comprise at least four wheels, wherein preferably at least two wheels are driven by at least one electrical motor. In particular, the rear wheels may be driven by at least one electrical motor.

In an embodiment, the vehicle is a dumper truck. The dumper truck may comprise a chassis 2 and a dump body 4 for transporting loads. The dump body may be pivotably attached to the chassis 2 with a horizontally aligned pivot axis. The vehicle may comprise an actor, in particular a hydraulic cylinder, for raising and lowering the dump body 4. The dump body 4 may be configured such that a load transported in the dump body will slide out of the dump body when the dump body is raised into an unloading position.

The trolley system of the present invention my equally be used with other vehicles and movable equipment, such as excavators, trucks or drilling equipment.

In an embodiment, the trolley system may be used on a mine site.

In the embodiment shown in FIG. 1, the current collector assembly is provided between the wheels 3 of the vehicle, at a bottom side of the chassis 2. This configuration will make it easier for a driver of the vehicle to drive along the trolley line.

In alternative configurations, the current collector assembly may be provided on a side of the chassis, and may for example be attached to the side of the chassis by a holding arm.

In a first aspect, the vehicle may comprise a cabin for a driver, the vehicle being configured to be manually steered by the driver from the cabin. In a second aspect, which may be combined with the first aspect, the vehicle may be configured to drive autonomously or to be steered remotely.

The embodiments discussed herein incorporate various aspects and aspects of the present application in combination. These aspects and aspects can however also be implemented independently of each other.

The following embodiments of the present invention are described with reference to the drawings, and may comprise, in addition to the features described below, all the features shown in the drawings. In this respect, it is noted that all the figures but for FIG. 1 are true to scale drawings of a specific embodiment. However, the features of the embodiments may also be implemented independently from any of the further features shown in the drawings, or with embodiments having differently sized and scaled elements.

The present application comprises a trolley system for providing electrical power to the vehicle 1, the system comprising a trolley line 10 and a current collector assembly 20 mounted on the vehicle 1 for establishing a sliding electrical contact with a conductor 17 of the trolley line 10.

In a first aspect, the trolley line 10 is a flexible structure to be loosely positioned on a ground surface. Therefore, road maintenance is no longer critical, as the trolley line will adapt to changing road layouts. Further, the vehicle does not have to follow a predefined path and will still be able to contact the trolley line. If the position of the road or of the vehicle changes, the trolley line can simply be dragged along.

In a second aspect, the trolley line 10 is a sealed structure with an insulating housing 13 comprising a sealing arrangement for sealing an opening 18 extending along the trolley line 10. Thereby, a conductor 17 of the trolley line 10 is sealingly enclosed in the insulating housing 13, increasing safety and reliability. The current collector assembly 20 will open the sealing arrangement and penetrate through the opening 18 to establish electrical contact. When the current collector assembly 20 has passed by a section of the trolley line, the sealing arrangement will again seals the opening 18 and encloses the conductor 17.

The opening 18 may in particular have the form of a slit reaching through the insulating housing 13 to a space containing the conductor 17, and may be provided between two abutting wall sections of the insulating housing 13.

In an embodiment more fully described in the following, drive wheels may be provided on the current collector assembly for completing the opening action. The drive wheels may or may not be motorized.

In an embodiment, the trolley system is configured such that the current collector assembly 20 raises the trolley line 10 from the ground for establishing the sliding electrical contact. Thereby, dirt on the road surface is less likely to enter into the housing or deteriorate the electrical contact.

In an embodiment, the trolley line 10 is fixed to the ground at at least one end by a foundation block 11. The foundation block will make sure that the trolley line is not dragged away by the current collector assembly. Further, it defines a specified point of entry where the current collector assembly can be engaged with the trolley line.

In an embodiment, the foundation block 11 comprises an entry funnel 12 for the current collector assembly. The entry funnel simplifies the engagement with the current collector assembly.

In an embodiment, the trolley line 10 is composed of modular sections. This simplifies transport and maintenance of the trolley line.

In an embodiment, the trolley line 10 comprises an insulating housing 13 enclosing the conductor 17, the insulating housing comprising at least one opening 18 extending along the trolley line 10 allowing access for a current collector element to establish the sliding electrical contact with the conductor 17.

In an embodiment, the insulating housing 13 comprises a lower section 16 to be positioned on a ground surface, and an upper section 15 to cover the conductor 17, the conductor 17 being positioned between the lower section 16 and the upper section 15, the at least one opening 18 being provided between the lower and the upper section.

In an embodiment, the opening 18 is provided at a lateral side of the housing between the lower and the upper section.

In an embodiment, the conductor 17 comprises at least two conductor lines extending within the insulating housing 13, the insulating housing 13 comprising at least two openings 18 for allowing access to the conductor lines by separate current collector elements of the current collector assembly.

In an embodiment, the openings 18 are provided at the two lateral sides of the housing between the lower and the upper section.

In an embodiment, the trolley line 10 comprises a sealing arrangement 19 configured for sealingly closing the opening 18 when the current collector assembly is not engaged with the flexible trolley line 10, the current collector assembly being configured to open the opening 18 to gain access to at least one conductor line of the flexible trolley line.

In an embodiment, the upper section 15 is configured to press a sealing area 19a of the upper section 15 into sealing contact with a sealing area 19b of the lower section to sealingly close the opening 18.

In an embodiment, the upper section 15 comprises at least one out of a void 31 and a reinforced section 37 for urging the sealing area 19a of the upper section into sealing contact with the sealing area 19b of the lower section.

In an embodiment, a recessed portion 14 is provided on at least one side surface of the housing between the lower section 16 and the upper section 15, the at least one opening 18 extending within the recessed portion 14. The recessed portion will protect the opening and may further act as a guiding channel for the collector assembly.

In an embodiment, an upper side of the recessed portion 14 arranged on the upper section 15 comprises drip ledges 32 for keeping water away from the opening 18 and the conductors 17.

In an embodiment, the lower section comprises an integrated foot section 38 to keep the conductor 17 at a predefined distance from the ground.

In an embodiment, the housing 13 is made from an elastomeric material, preferably from a rubber material such as rubber or reinforced/belted rubber.

In an embodiment, the current collector assembly comprises at least one guiding element 22 engaging with the trolley line. In embodiment, the guiding element 22 may engage with a recess 14 extending along the trolley line.

In an embodiment, the guiding element may engage with the trolley line for raising a section of the trolley line off the ground.

In an embodiment, the guiding element 22 comprises a guiding wheel that is at least one out of rotatably supported on the current collector assembly and driven by a motor 23 in synchronization with a speed of the vehicle 1. This will avoid undue drag on the trolley line.

In an embodiment, the guiding element 22 engages with the recessed portion 14 for opening the opening 18 and allowing a current collector element 21 of the current collector assembly 20 to establish the sliding contact with the conductor 17 by reaching through the opening 18.

In an embodiment, the current collector comprises a cleaning arrangement for cleaning the flexible trolley line, such as a brush or a compressed air source.

The present application further comprises a trolley line.

In a first aspect, the trolley line comprises an insulating housing 13 enclosing a conductor 17, the trolley line being a flexible structure to be loosely positioned on a ground surface.

In a second aspect, the trolley line comprises an insulating housing 13 enclosing a conductor 17, the trolley line being a sealed structure with the insulating housing 13 comprising a sealing arrangement 19 for sealing an opening 18 extending along the trolley line, the opening 18 allowing access for a current collector element 21 to establish a sliding electrical contact with the conductor 17.

In an embodiment, the first and the second aspect are provided in combination, i.e. the trolley line is a flexible structure to be loosely positioned on a ground surface and comprises a sealing arrangement 19 for sealing an opening 18 extending along the trolley line.

In an embodiment, the trolley line is configured as described above with respect to the trolley system.

The present application further comprises a method of providing electrical power to a vehicle, the method comprising:
  engaging with a current collector assembly of the vehicle a trolley line that is at least one out of loosely positioned on a ground surface and a sealed structure with an insulating housing comprising a sealing arrangement for sealing an opening extending along the trolley line;
  travelling the vehicle along the trolley line, with the current collector assembly at least one out of raising a section of the trolley line from the ground and opening a section of the opening extending along the trolley line, and
  the current collector assembly establishing a sliding electrical contact with a conductor of the trolley line, the sliding electrical contact being established at least one out of in the section of the trolley line raised from the ground and by a current collector reaching through the opened section of the opening of the insulating housing.

The two aspects of the method may be combined. Further, the method may use a trolley line and a trolley system as described above, and may proceed as described above with respect to the operation of the trolley system.

Further details of the trolley system, its components and its operation are described in the following.

The current collector assembly 20 may be attached to the vehicle at a defined height above the ground surface. In an embodiment, the attachment with the vehicle is flexible to allow the current collector assembly to adapt to tolerances in the height of an entry section of the trolley line. Further, the connection may have a certain flexibility in the horizontal direction to simplify establishing contact with the trolley line. Such a flexible connection may for example be provided by a spring-loaded linkage.

Figure 2:
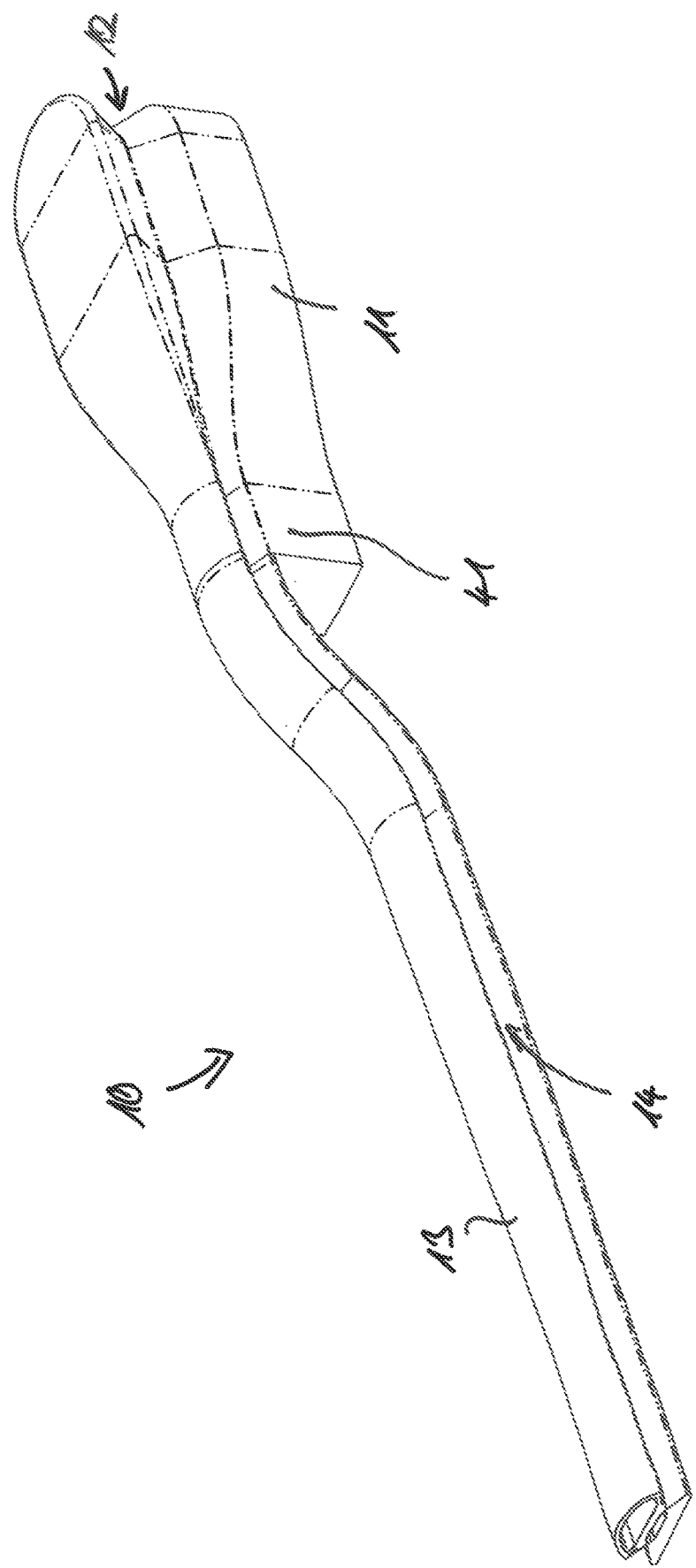
FIG. 2 shows an embodiment of a trolley line comprising a foundation block.

FIG. 2 shows a specific embodiment of an entry section of the trolley line 10. The entry section is provided with a foundation block 11 fixed to the ground surface. The foundation block 11 will thereby fix the entry section of the flexible trolley line 10 at a specific location to the ground, the other sections of the trolley line being loosely positioned on a ground surface.

The entry section of the foundation block 11 that establishes the connection with the current connector assembly is positioned at a specified distance above ground. This distance is equal to the height at which the current collector assembly is provided at the vehicle. The foundation block 11 may comprise an entry funnel 12 for receiving guiding elements of the current collector assembly.

The foundation block 11 provides a defined entry position for establishing contact between the current collector assembly and the flexible trolley line. Further, it avoids that the flexible trolley line is dragged away by the engagement with the current collector assembly. The flexible trolley line will bend down from an end section 41 of the foundation block 11 to the ground surface, and from thereon lie loosely on the ground surface.

In an embodiment of the present invention, the flexible trolley line is only connected to the ground surface at the foundation block. In particular, the other end of the trolley line may be loosely positioned on the road surface. In alternative embodiments, foundation blocks may be provided along the extension of the trolley line and/or at the other end section, in order to connect the flexible trolley line at specific locations along its extension to the ground surface.

The trolley line may be configured as a modular construction, with modular trolley line sections being connectable to each other. In particular, consecutive sections of the flexible trolley line may be connectable to each other via clip connectors.

Figure 6:
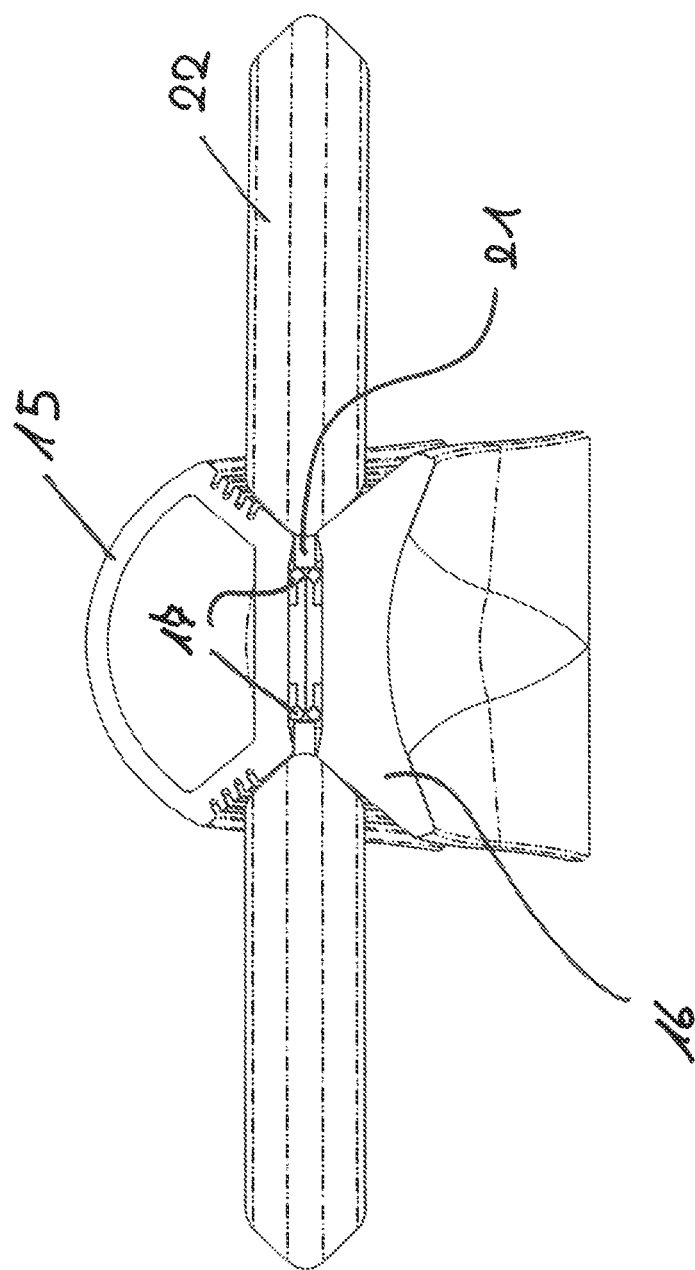
FIG. 6 shows the current collector assembly engaged with the trolley line in a sectional view.

As can be seen from FIGS. 2, 6 and 7, the flexile trolley line comprises an insulating housing 13 enclosing the conductor lines 17. The insulating housing 13 is provided at at least one and preferably at its two lateral sides with an opening 18, which can be opened in order to allow access to the conductor lines 17.

In the embodiment, the housing 13 comprises an upper section 15 and a lower section 16, with the opening(s) being provided between the upper and the lower section. At the lateral sides of the housing, a recess 14 extends along the trolley line. The opening 18 is provided at the apex of recess 14.

As can be seen from FIG. 2, the entry funnel of the foundation block is provided at the two lateral sides of the foundation block, with the recesses extending along the flexible trolley line opening up into the entry funnels of the foundation block. With the recesses 14 extending through the foundation block, the guiding elements 22 of the current collector assembly will be guided into the recesses via the entry funnels.

The openings 18 may equally extend through the foundation block and along the apex of the entry funnels, or may start after the foundation block at a position along the flexile trolley line.

Figure 3:
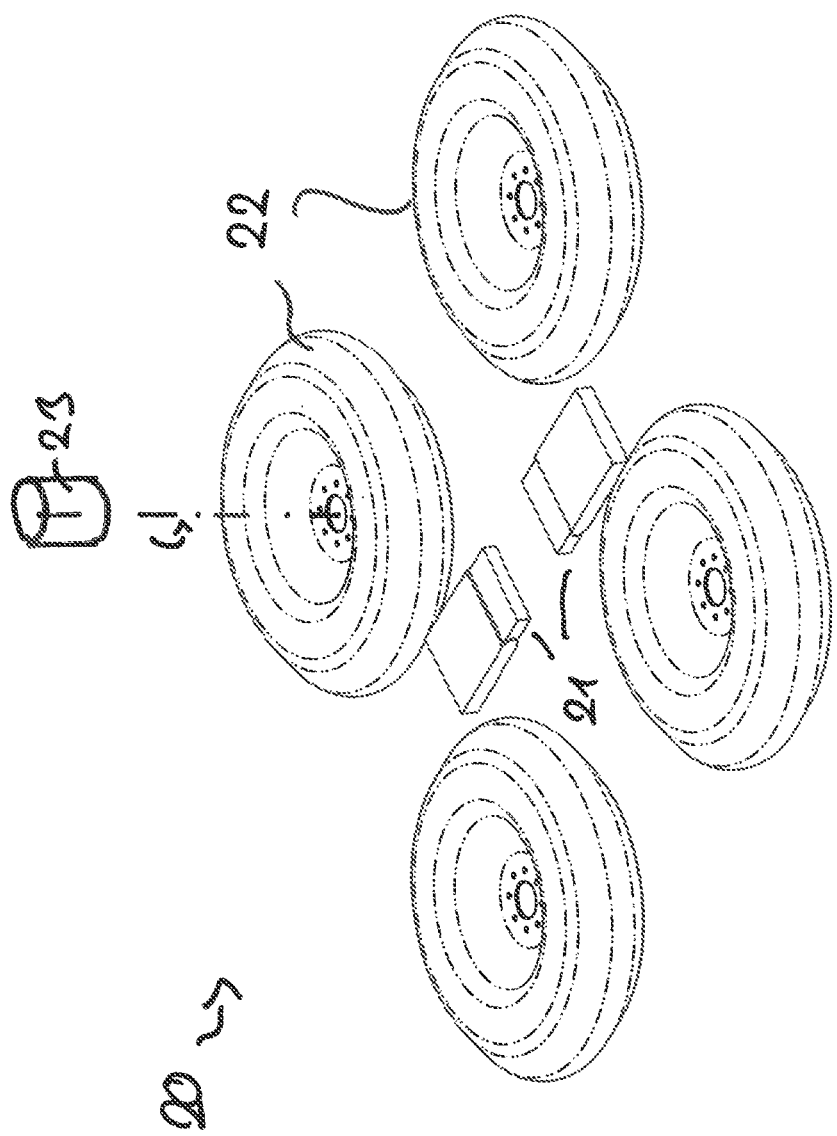
FIG. 3 shows an embodiment of a current collector assembly comprising guiding elements.
Figure 4:
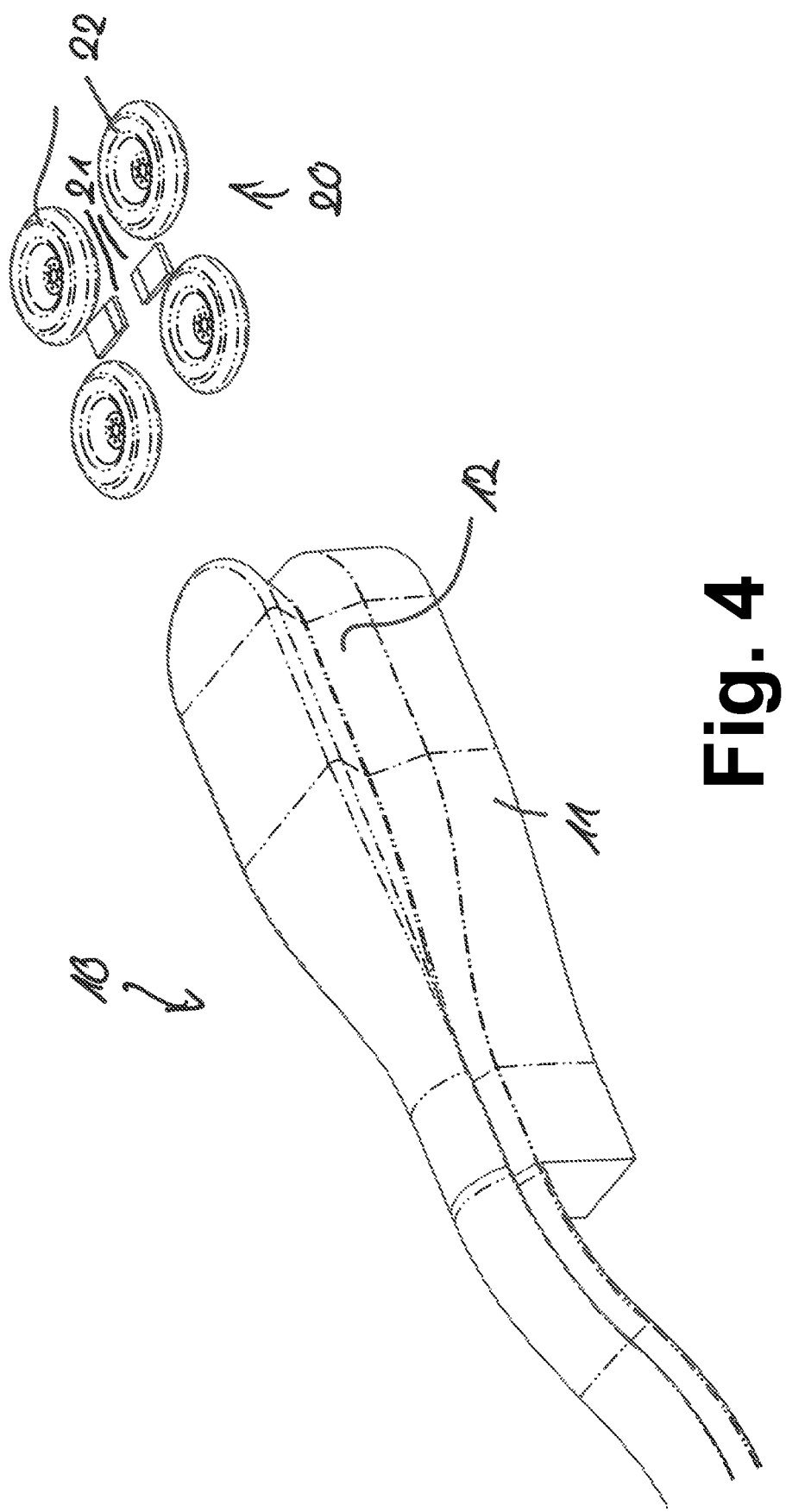
FIG. 4 shows an embodiment of the current collector assembly before entering the foundation block of the trolley line.

FIG. 3 shows an embodiment of the current collector assembly. The current collector assembly 20 comprises two current collector elements 21 for establishing the sliding electrical contact with the conductor lines 17 of the flexible trolley line. The current collector elements 21 are configured to reach through the opening 18 into the housing and connect to the conductor lines 17, see FIG. 6.

The current collector assembly further comprises guiding elements 22 establishing the mechanical contact with the flexible trolley line.

Figure 5:
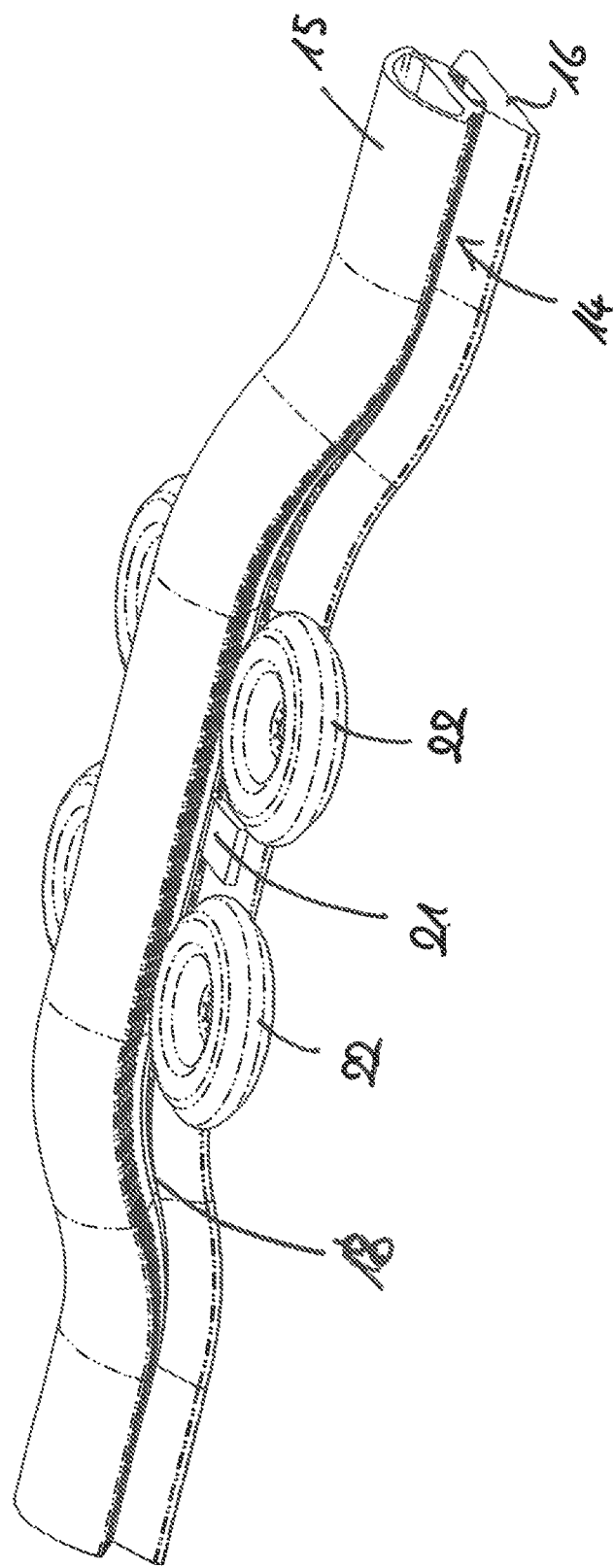
FIG. 5 shows the current collector assembly engaged with the trolley line in a perspective view.

In particular, as can be seen from FIG. 5, the guiding elements 22 will raise a section of the flexible trolley line from the ground surface, in order for the current collector elements to establish electrical contact within this section.

Further, in the embodiment, the guiding elements 22 are configured to open the opening 18 of the insulating housing 13, in order to allow access of the current collector elements 21 to the conductor lines arranged within the housing. In the embodiment, the opening 18 is opened in the section of the flexible trolley line raised by the guiding elements 22.

In the embodiment, the guiding elements 22 engage with the recess 14 extending along the flexible trolley line. In particular, an upper section of the recess will come to lie on an upper side of the guiding elements, such that the guiding elements urge the housing away from the ground. A lower section of the guiding elements will contact a lower section of the recess 14, opening the opening 18 between the upper and the lower section of the recess.

In the embodiment, the guiding elements 22 are wheels that are rotatably attached to an attachment portion of the current collector assembly. In an embodiment of the invention, at least one of the wheels is driven by a motor 23.

In an embodiment, the motor 23 driving the wheel 22 is controlled in dependence on the speed of the vehicle. In particular, the motor may be controlled to drive the wheel 22 along the conductor line with the same speed as the vehicle drives over the ground surface. This will reduce drag on the flexible trolley line.

In an embodiment, the current collector assembly or the vehicle comprises a controller configured to control the motor 23 as described above. In particular, the controller may comprise a microprocessor and program code stored on a non-volatile storage. The controller may be in communication with a vehicle controller, or part of the vehicle controller. It may receive the vehicle speed as an input parameter. The program code may control the motor 23, when running on the microprocessor, to operate in synchronisation with the vehicle speed.

In an embodiment, at least two of the guiding wheels arranged on opposite sides of the trolley line are driven by one or several motors as described above.

In the embodiment, the current collector assembly comprises four guiding elements, with two guiding elements arranged along the trolley line behind each other on each lateral side of the trolley line, and the current collector elements 21 provided between the guiding elements along the trolley line. The guiding elements will thereby provide a section of the trolley line where the opening 18 is opened, and the current collector elements 21 are provided in this section.

The current collector assembly may further be equipped with a cleaning arrangement for cleaning the conductor line, and in particular for removing debris from the recess 14 and the opening 18. For example, the cleaning arrangement may comprise one or several brushes engaging with the recess and/or the opening. In addition or instead of brushes, the cleaning arrangement may comprise an air cleaning arrangement where pressurized air is guided via a nozzle to clean the recess, the opening and/or the inner area of the trolley line comprising the conductors 17.

The cleaning arrangement may be provided in front of the frontward guiding elements or between the frontward guiding elements and the current collector elements 21.

The current collector assembly, as shown in FIG. 5, will therefore raise a section of the flexible trolley line from the ground, in order to establish the electrical contact at this raised section. After the current collector assembly has passed, the trolley line will again drop to the ground surface.

Figure 7A:
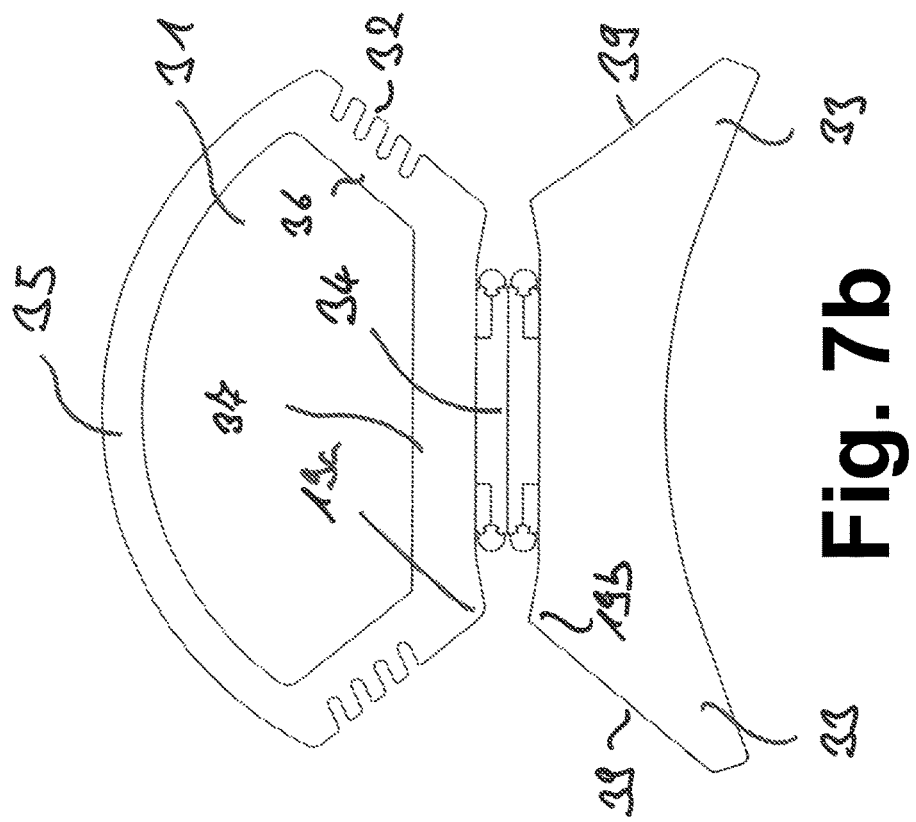
FIG. 7a shows the trolley line in a sectional view in a sealed state.
Figure 7B:
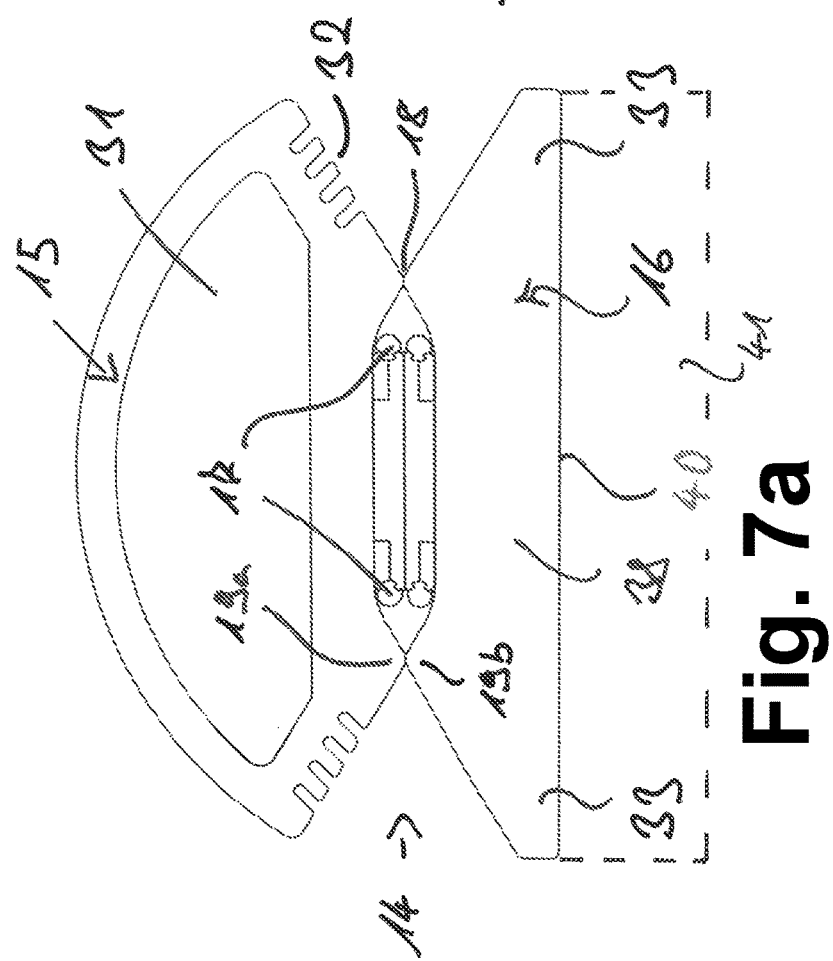
FIG. 7b shows the trolley line in a sectional view in an opened state.

Further details of the construction of the flexible trolley line and in particular of the housing 13 are shown in FIGS. 6, 7a and 7b. FIGS. 6 and 7b show the housing in an opened condition, allowing access of the current collector elements 21 to the conductor lines 17. FIG. 7a shows the housing in a closed condition, where the conductor lines 17 are enclosed by the housing and sealing parts 19a and 19b are in sealing contact to close the opening 18 provided there between.

In an embodiment of the present invention, the housing is made from a flexible elastomeric material, in particular from a rubber material such as rubber or reinforced, belted rubber.

The housing may be further configured to establish the sealing contact along the opening in the closed position, and to improve the opening behaviour of the trolley line, when engaged with the current collector assembly.

In particular, in the embodiment, the upper section 15 of the housing comprises a void 31 extending along the trolley line, with an upper dome-shaped section 35 forming a roof section above the void 31, and a lower reinforced section 37 being provided as a bottom section below the void. Side sections 36 connecting the bottom section 37 and the roof section 35 extend obliquely to the outside, forming an upper side of the recesses 14.

The side sections 36 of the upper section 16 forming the upper side of the recess 14 are provided with drip ledges 32 for keeping water away from the opening 18. The drip ledges 32 may be provided by recesses extending along the upper side of the recess 14.

The sealing areas 19a are arranged at the interface between the side sections 36 and the bottom section 37. In an embodiment, they may form, in the closed condition shown in FIG. 7a, protrusions extending downwards from the bottom section 37. The sealing areas 19a may also be shaped differently.

As can be seen from FIGS. 7a and 7b, when the guiding elements are in contact with the side sections 36, the upper section 15 will be deformed and the side sections 36 will extend at an increased angle with respect to a horizontal direction. At the same time, the dome-shaped roof section will have an increased curvature allowing the top ends of the side sections to move closer to each other.

By this pivot movement of the side sections 36, the sealing areas 19a of the upper sections 15 will be raised, moving them away from sealing areas 19b of the lower section 16.

The lower section 16 of the housing has an essentially trapezoid shape, with a bottom side 40 lying on a ground surface, and side sections 39 extending obliquely inwardly from lateral end section 33 of the lower side 40, the side sections 39 forming the lower sides of the recess 14.

Sealing areas 19b are provided at the two lateral sides of the lower section 16 at an interface between the side sections 39 of the lower section 16 and an upper side of the lower section 16.

In an embodiment, in the closed condition shown in FIG. 7a, the sealing areas 19b may be formed as protrusions extending upwards from an upper side of the lower section 16. The sealing areas 19b may also be shaped differently.

The upper and the lower section are connected by a connecting portion 34, the connecting portion 34 being arranged between the two parallel conductor lines 17, the conductor lines being arranged inside the closed spaces formed by the sealing areas 19a and 19b.

In the opened condition shown in FIG. 7b, the contact with the guiding elements 22 will deform the lower section 16 such that the sealing areas 19b are lowered away from the sealing areas 19a of the upper section 15. The guide wheels 22 are laterally positioned so that they are narrower than the at rest assembly. When they engage the assembly it provides a prying action to open the sealing area.

In the embodiment, the lower side 40 of the lower section 16 will be concavely deformed with the lateral end sections 33 lowered with respect to a middle section. Further, the angle at which the side sections 39 extend obliquely upwards with respect to a horizontal line are increased in the open state.

Through the configuration of the sealing areas and the opening, the housing comprises at least one sealed inner section, accessible via the opening 18, comprising at least one conductor line 17.

The lower section 16 is, in the embodiment, provided as a massive body. In alternative configurations, it may equally be configured with a void. The void and shape of the upper section 15 provides a spring type resistance to opening of the sealing area.

In the embodiment, the lower section comprises a small foot section establishing a certain height of the recess 14 above ground. Depending on the road conditions, this foot section could be increased in height to provide an increased distance of the recess and the opening 18 from the ground surface. An embodiment having an increased height is shown in FIG. 7a in dotted lines.

The foot section could be provided as a separate body 41 connected to the lower side 40 of the lower section, or simply by increasing the height of the lower section.

In the embodiment shown in FIG. 7a, two conductor lines 17 are provided, each accessible via an opening arranged on a lateral side of the trolley line.

In the embodiment, the two conductor lines are each configured as two separate physical lines arranged above each other, in order to improve the sliding electrical contact with the current collector elements 21. In alternative configurations, the conductor lines 17 may equally be provided as single lines, or as multiple lines comprising more than two separate physical conductor lines.

The two conductor lines 17 arranged on the two sides of the trolley line are electrically isolated from each other by the housing 13. In particular, the connection portion 34 arranged between the two conductor lines 17, connecting the upper section and the lower section of the housing, may be formed from an isolating material.

The housing thereby forms two separate inner sections, each accessible via one of the openings 18, and each comprising one of the conductor lines 17.

Each of these inner sections is opened via and accessible via the opening 18 when the trolley line 10 engages with the current collector assembly 20.

Figure 8:
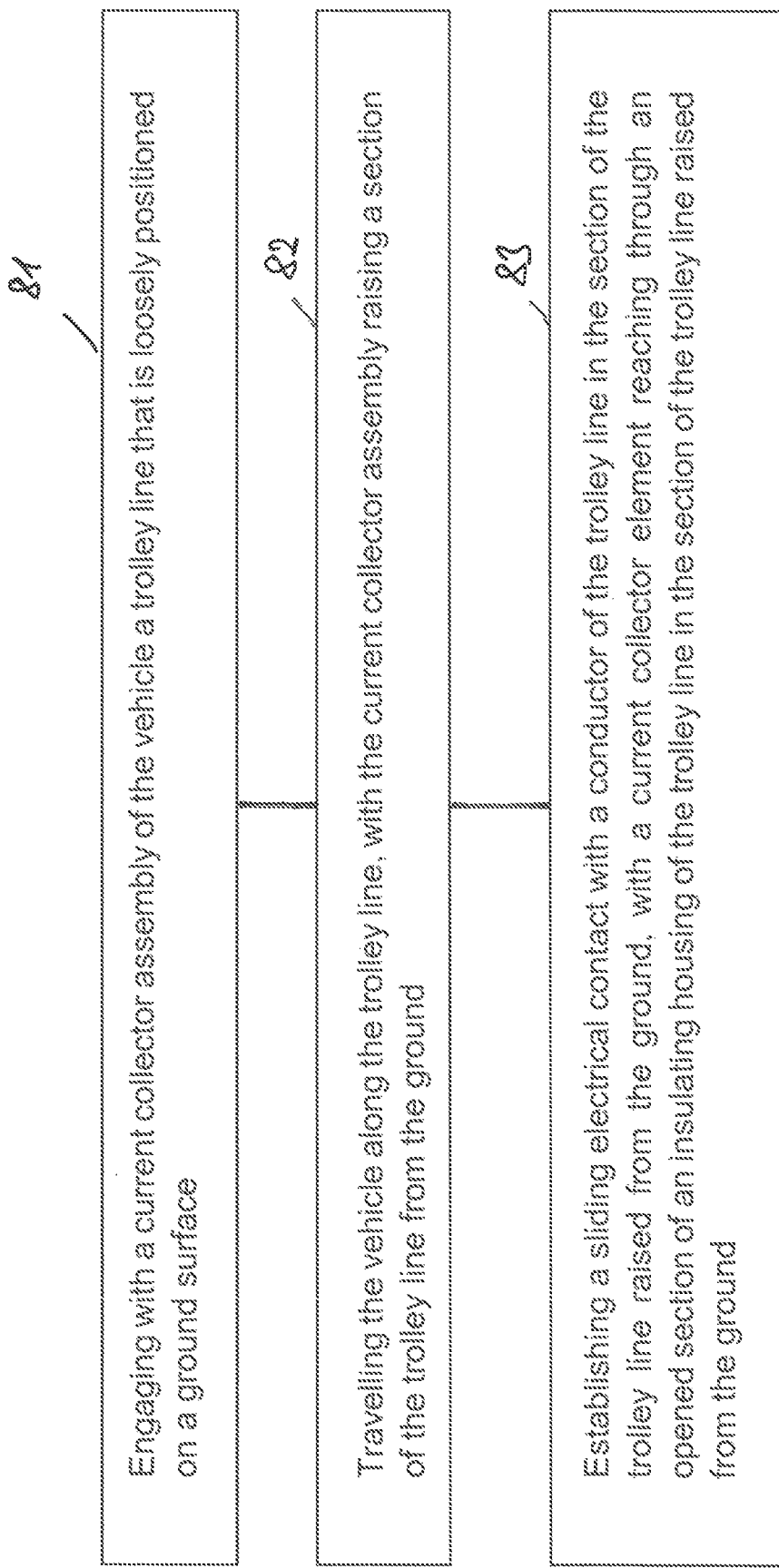
FIG. 8 shows a first embodiment of a method for providing electrical power to a vehicle.
Figure 9:
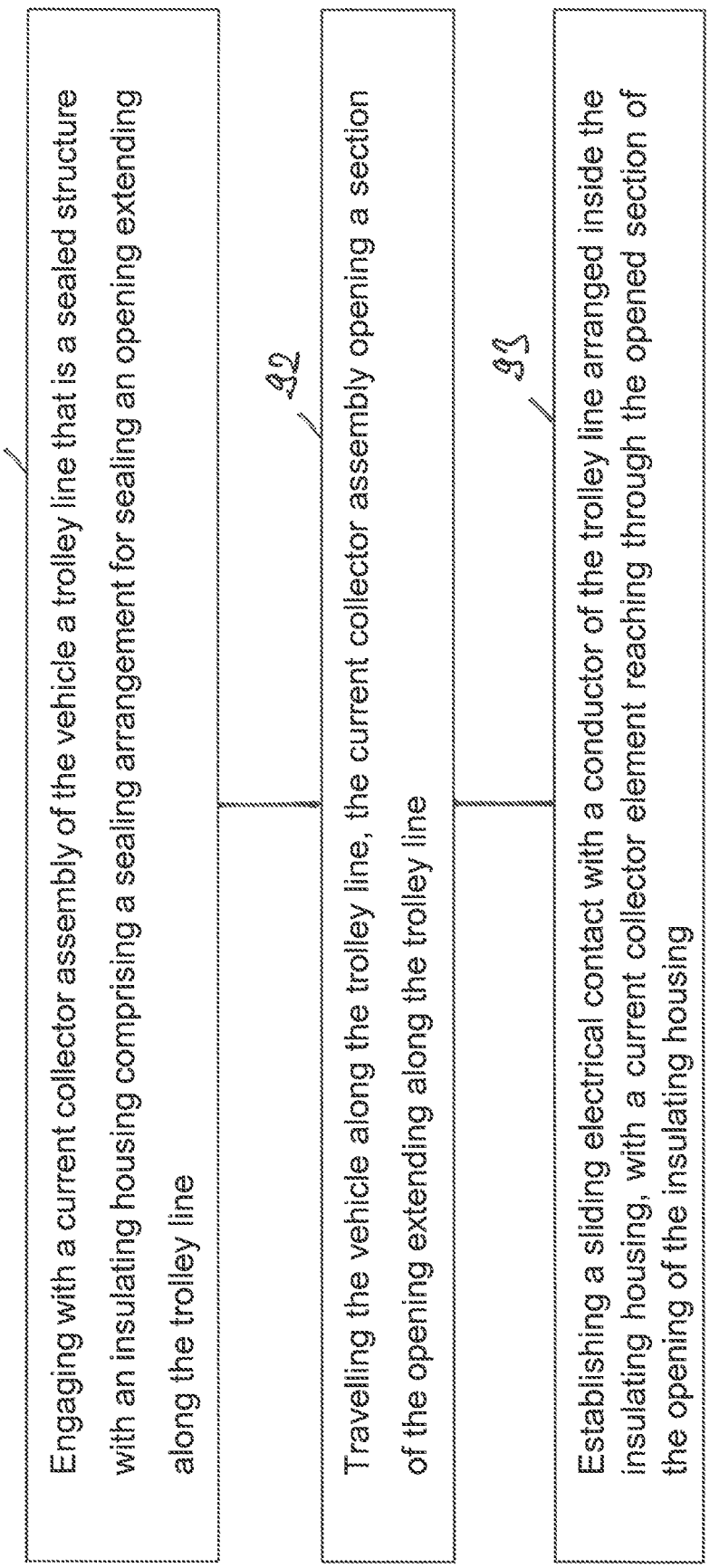
FIG. 9 shows a second embodiment of a method of providing electrical power to a vehicle.

Aspects of a method for operating the trolley system are shown in FIGS. 8 and 9.

As shown in FIG. 8 in step 81, the method comprises engaging with a current collector assembly of a flexible trolley line that is loosely positioned on a ground surface.

Step 82 comprises travelling the vehicle along the trolley line, with the current collector assembly raising a section of the trolley line from the ground while travelling along the trolley line.

Step 83 comprises establishing a sliding electrical contact with a conductor of the trolley line in the section of the trolley line raised from the ground via an element 21 of the current collector 20. In particular, the sliding electrical contact may be established via current collector element 21 reaching through an opened section of an insulating housing 13 of the trolley line 10 in the section of the trolley line 10 raised from the ground.

In the second aspect shown in FIG. 9, step 91 comprises engaging a trolley line with a current collector assembly of the vehicle, the trolley line being a sealed structure with an insulating housing comprising a sealing arrangement for sealing an opening extending along the trolley line.

Step 92 comprises travelling the vehicle along the trolley line, the current collector assembly opening a section of the opening extending along the trolley line while travelling along the trolley line.

Step 93 comprises establishing a sliding electrical contact with a conductor of the trolley line arranged inside the insulating housing, with a current collector element reaching through the opened section of the opening.

In an embodiment of the present invention, steps 81 and 91 are combined, with the trolley line being loosely positioned on a ground surface and a sealed structure with an insulating housing and an opening extending along the trolley line.

Further, steps 82 and 92 may be performed in combination. In particular, while travelling along the trolley line, the current collector assembly may raise a section of the trolley line from the ground and open the opening in at least a part of the raised section.

Further, steps 83 and 93 may be performed in combination. In particular, the current collector assembly may establish a sliding electrical contact with a conductor of the trolley line arranged inside the insulating housing in the raised section of the trolley line, with a current collector reaching through the opened section of the opening.

Further, the method may be performed as described above with respect to the system, and may in particular be used to operate a trolley system as described above.

The invention claimed is:

1. A trolley system for providing electrical power to a vehicle, the trolley system comprising:
 a trolley line comprising an insulating housing enclosing a conductor, wherein the trolley line is:
  a flexible structure to be loosely positioned on a ground surface; and
  a current collector assembly mounted on the vehicle for establishing a sliding electrical contact with the conductor of the trolley line,
  wherein the trolley system is configured such that the current collector assembly raises the trolley line from the ground surface for establishing the sliding electrical contact.

2. The trolley system of claim 1, wherein the trolley line is a sealed structure with the insulating housing comprising a sealing arrangement for sealing an opening extending along the trolley line.

3. The trolley system of claim 2, wherein the insulating housing comprises at least one opening extending along the trolley line allowing access for a current collector element to establish the sliding electrical contact with the conductor.

4. The trolley system of claim 3, wherein the insulating housing comprises a lower section to be positioned on the ground surface, and an upper section to cover the conductor, the conductor being positioned between the lower section and the upper section, the at least one opening being provided between the lower and the upper section.

5. The trolley system of claim 4, wherein the upper section is configured to press a sealing area of the upper section into sealing contact with a sealing area of the lower section to sealingly close the at least one opening.

6. The trolley system of claim 5, wherein the upper section comprises at least one out of a void and a reinforced section for urging the sealing area of the upper section into sealing contact with the sealing area of the lower section.

7. The trolley system of claim 4, wherein a recessed portion is provided on at least one side surface of the insulating housing between the lower section and the upper section, the at least one opening extending within the recessed portion.

8. The trolley system of claim 7, wherein an upper side of the recessed portion arranged on the upper section comprises drip ledges for keeping water away from the at least one opening and the conductor.

9. The trolley system of claim 3, wherein the conductor comprises at least two conductor lines extending within the insulating housing, the insulating housing comprising at least two openings for allowing access to the at least two conductor lines by separate current collector elements of the current collector assembly.

10. The trolley system of claim 3, the trolley line comprising a sealing arrangement configured for sealingly closing the at least one opening when the current collector assembly is not engaged with the trolley line, the current collector assembly being configured to open the at least one opening to gain access to at least one conductor line of the trolley line.

11. The trolley system of claim 3, wherein the insulating housing is made from an elastomeric material, including a rubber material including at least one out of rubber and reinforced rubber.

12. The trolley system of claim 1, wherein the trolley line is fixed to the ground surface at at least one end by a foundation block.

13. The trolley system of claim 12, the foundation block comprising an entry funnel for the current collector assembly.

14. The trolley system of claim 1, wherein the trolley line is composed of modular sections.

15. The trolley system of claim 1, the current collector assembly comprising at least one guiding element engaging with the trolley line, wherein the at least one guiding element comprises a guiding wheel that is either or both rotatably supported on the current collector assembly and driven by a motor in synchronization with a speed of the vehicle.

16. The trolley system of claim 15, the at least one guiding element engaging with a recessed portion for opening the opening and allowing a current collector element of the current collector assembly to establish the sliding electrical contact with the conductor by reaching through the opening.

17. The trolley system of claim 1, wherein the opening extending along the trolley line is a slit provided between two wall sections of the insulating housing of the trolley line.

18. The trolley system of claim 1, the current collector assembly comprising a cleaning arrangement for cleaning the trolley line.

19. A trolley line for providing electrical power to a vehicle, the trolley line comprising an insulating housing enclosing a conductor, the trolley line being a flexible structure to be loosely positioned on a ground surface and configured to be raised from the ground surface by a current collector assembly for establishing a sliding electrical contact with the conductor.

20. The trolley line of claim 19, wherein the trolley line is a sealed structure with the insulating housing comprising a sealing arrangement for sealing an opening extending along the trolley line, the opening allowing access for a current collector element to establish a sliding electrical contact with the conductor.

21. A method of providing electrical power to a vehicle, the method comprising:
engaging with a current collector assembly of the vehicle a trolley line that is positioned on a ground surface;
travelling the vehicle along the trolley line, with the current collector assembly raising a section of the trolley line from the ground surface, and
the current collector assembly establishing a sliding electrical contact with a conductor of the trolley line, the sliding electrical contact being established in the section of the trolley line raised from the ground surface.

22. The method of claim 21, wherein:
the trolley line is a sealed structure with an insulating housing comprising a sealing arrangement for sealing an opening extending along the trolley line, and
the current collector assembly opens a section of the opening extending along the trolley line and establishes the sliding electrical contact with the conductor of the trolley line by a current collector reaching through the opened section of the opening of the insulating housing.

* * * * *